United States Patent
Smith

(10) Patent No.: US 9,914,336 B2
(45) Date of Patent: Mar. 13, 2018

(54) ELECTRIC COMPARTMENT COOLING APPARATUS AND METHOD

(75) Inventor: Mark G. Smith, Canton, MI (US)

(73) Assignee: Ford Global Technologies, LLC, Dearborn, MI (US)

(\*) Notice: Subject to any disclaimer, the term of this patent is extended or adjusted under 35 U.S.C. 154(b) by 1909 days.

(21) Appl. No.: 12/822,307

(22) Filed: Jun. 24, 2010

(65) Prior Publication Data
US 2011/0165830 A1  Jul. 7, 2011

(51) Int. Cl.
| | |
|---|---|
| *B60H 1/00* | (2006.01) |
| *B60H 1/24* | (2006.01) |
| *B60L 1/00* | (2006.01) |
| *B60L 11/18* | (2006.01) |

(52) U.S. Cl.
CPC .......... *B60H 1/00278* (2013.01); *B60H 1/24* (2013.01); *B60L 1/003* (2013.01); *B60L 11/1874* (2013.01); *B60L 11/1877* (2013.01); *B60H 2001/003* (2013.01); *B60H 2001/00178* (2013.01); *B60L 2210/10* (2013.01); *B60L 2210/30* (2013.01); *B60L 2210/40* (2013.01); *B60L 2240/34* (2013.01); *B60L 2240/662* (2013.01); *Y02T 10/7005* (2013.01); *Y02T 10/705* (2013.01); *Y02T 10/7216* (2013.01);
(Continued)

(58) Field of Classification Search
USPC .......... 454/75, 140, 141, 142, 143, 156, 139
See application file for complete search history.

(56) References Cited

U.S. PATENT DOCUMENTS

| | | | |
|---|---|---|---|
| 2,989,854 A | 6/1961 | Gould | |
| 3,908,900 A * | 9/1975 | Smith | ............. 237/12.3 A |
| 4,178,840 A | 12/1979 | Caknis | |

(Continued)

FOREIGN PATENT DOCUMENTS

| | | |
|---|---|---|
| CN | 101340013 A | 1/2009 |
| EP | 1469258 A1 | 10/2004 |

(Continued)

OTHER PUBLICATIONS

Applicant's Statement of Relevance in Accordance With 37 C.F.R. 1.98(a)(3)(i) for IDS Reference JP 2008043098A.
(Continued)

*Primary Examiner* — Alissa Tompkins
*Assistant Examiner* — Frances F Hamilton
(74) *Attorney, Agent, or Firm* — David E. Kelley; Brooks Kushman P.C.

(57) ABSTRACT

An automotive vehicle has a passenger cabin, an HVAC system adjustable between a fresh air mode and a recirculate mode, a compartment containing a heat-producing electrical component, and a non-passenger compartment that is ventilated to outside of the vehicle. A duct has an inlet end adjacent the compartment and an outlet end adjacent an air intake of the HVAC system. A valve controls whether cooling air exiting the compartment is directed into the duct or into the non-passenger compartment. The valve is operated to direct a majority of the cooling air into the duct when the HVAC system is in the recirculate mode, and into the non-passenger compartment when the HVAC system is in the fresh air mode. Air from the non-passenger compartment may be vented out of the vehicle through an air extractor vent.

6 Claims, 2 Drawing Sheets

(52) U.S. Cl.
CPC ........ *Y02T 10/7241* (2013.01); *Y02T 10/7291* (2013.01); *Y02T 90/16* (2013.01)

(56) References Cited

U.S. PATENT DOCUMENTS

| | | | |
|---|---|---|---|
| 4,616,559 A | 10/1986 | Barlow | |
| 5,119,718 A | 6/1992 | Wagner et al. | |
| 5,127,878 A | 7/1992 | Meckler | |
| 5,354,114 A | 10/1994 | Kelman et al. | |
| 5,392,873 A | 2/1995 | Masuyama et al. | |
| 5,566,880 A | 10/1996 | Khelifa et al. | |
| 5,636,993 A | 6/1997 | Badry | |
| 5,647,534 A | 7/1997 | Kelz et al. | |
| 5,706,170 A | 1/1998 | Glovatsky et al. | |
| 5,730,237 A | 3/1998 | Matsuki et al. | |
| 5,937,664 A | 8/1999 | Matsuno et al. | |
| 6,094,927 A | 8/2000 | Anazawa et al. | |
| 6,341,814 B1 | 1/2002 | Hoenninger et al. | |
| 6,361,429 B1 * | 3/2002 | Pawlak et al. | 454/139 |
| 6,383,599 B1 | 5/2002 | Bell et al. | |
| 6,409,591 B1 | 6/2002 | Sullivan et al. | |
| 6,491,578 B2 | 12/2002 | Yoshinori et al. | |
| 6,662,891 B2 | 12/2003 | Misu et al. | |
| 6,899,366 B2 | 5/2005 | Krueger et al. | |
| 6,899,381 B1 | 5/2005 | Fero et al. | |
| 6,902,020 B2 | 6/2005 | Kronner et al. | |
| 6,978,855 B2 | 12/2005 | Kubota et al. | |
| 7,048,321 B2 | 5/2006 | Bandoh et al. | |
| 7,079,379 B2 | 7/2006 | Yamaguchi et al. | |
| 7,290,829 B2 | 11/2007 | Umemoto et al. | |
| 7,396,062 B2 | 7/2008 | Hung et al. | |
| 7,396,075 B2 | 7/2008 | Ohkuma et al. | |
| 7,419,209 B1 | 9/2008 | Mangiapane et al. | |
| 7,451,608 B2 | 11/2008 | Kikuchi | |
| 7,484,794 B2 | 2/2009 | Loup et al. | |
| 7,625,039 B2 | 12/2009 | Mangiapane et al. | |
| 7,686,388 B2 | 3/2010 | Hasegawa et al. | |
| 7,688,582 B2 | 3/2010 | Fukazu et al. | |
| 7,823,672 B2 | 11/2010 | Watanabe et al. | |
| 7,919,203 B2 | 4/2011 | Shibuya et al. | |
| 7,997,966 B2 | 8/2011 | Yoda | |
| 8,016,063 B2 | 9/2011 | Tsuchiya | |
| 8,118,354 B2 | 2/2012 | Lucas | |
| 8,740,103 B2 | 6/2014 | Major et al. | |
| 2001/0040061 A1 | 11/2001 | Matuda et al. | |
| 2003/0060154 A1 | 3/2003 | Colinet | |
| 2005/0011692 A1 | 1/2005 | Takahashi et al. | |
| 2006/0005551 A1 | 1/2006 | Salim et al. | |
| 2007/0089442 A1 | 4/2007 | Tsuchiya | |
| 2007/0205623 A1 | 9/2007 | Hung et al. | |
| 2007/0259263 A1 | 11/2007 | Shibuya et al. | |
| 2008/0139102 A1 | 6/2008 | Major | |
| 2008/0197661 A1 | 8/2008 | Wozniak | |
| 2008/0297136 A1 | 12/2008 | Gaboury et al. | |
| 2009/0042501 A1 | 2/2009 | Hung | |
| 2009/0071178 A1 | 3/2009 | Major et al. | |
| 2009/0088062 A1 | 4/2009 | Major et al. | |
| 2009/0261176 A1 | 10/2009 | Major et al. | |
| 2010/0116568 A1 | 5/2010 | Kadoi | |
| 2010/0279597 A1 | 11/2010 | Cho et al. | |
| 2011/0233969 A1 | 9/2011 | Yamaguchi et al. | |
| 2012/0055725 A1 | 3/2012 | Mizoguchi et al. | |

FOREIGN PATENT DOCUMENTS

| | | |
|---|---|---|
| EP | 1935699 A1 | 6/2008 |
| JP | 2000245015 A | 9/2000 |
| JP | 2004352085 A | 12/2004 |
| JP | 2008043098 A | 2/2008 |

OTHER PUBLICATIONS

Chinese Patent Office, First Office Action for the corresponding Chinese Patent Application No. 201110138358.7 dated Sep. 25, 2014.

Chinese Patent Office, First Office Action in corresponding Chinese Patent Application No. 201110230971.1 dated Nov. 4, 2014.

* cited by examiner

ELECTRIC COMPARTMENT COOLING APPARATUS AND METHOD

BACKGROUND

1. Technical Field

The present invention relates to electrically-powered automotive vehicles having air-cooled electrical components.

2. Background Art

Electrically-powered vehicles, including hybrid-electric vehicle (HEVs), plug-in HEVs, pure electric vehicles, etc., generally have batteries and/or other electric components located in an electric compartment in or adjacent to a passenger cabin and/or a cargo compartment of the vehicle. Electric compartments are typically located beneath and/or behind one or more of the occupant seating positions, below the passenger cabin or cargo compartment floor, and/or behind trim panels. Electric components, particularly high-voltage components, typically generate a significant amount of heat during operation and so may require some degree of active cooling. This cooling is, in many cases, accomplished by providing a relatively constant flow of air into the electric compartment from within the vehicle passenger cabin.

In one conventional vehicle layout, the electric compartment is located directly behind and/or beneath an occupant seating position or row of seating positions. An air movement device, usually a fan, draws air into the electric compartment through one or more inlets and heated exhaust air is expelled into the passenger cabin and/or cargo compartment at one or more locations. In some cases the exhaust air, rather than being returned to the passenger cabin, is ducted or otherwise directed out of the vehicle entirely. This may be achieved by directing the air into a portion of the vehicle fitted with an air extractor vent, such as are commonly found in the trunk or rear cargo area.

If both the intake and exhaust openings of the electric compartment are located close to the same seating row, at least a portion of the heated exhaust air may find its way back to the inlet and be recirculated through the compartment. Heated exhaust air directed toward a trunk or other rear cargo area may rise and find its way into the passenger cabin. This has a degrading effect on the effectiveness of cooling of the equipment in the electric compartment. In addition, if the intake is at a relatively high position in the passenger cabin, for example behind the headrest of a seating row, this recirculation of warm exhaust air may make that seating row uncomfortably warm for occupants. This warming effect will be particularly noticeable when the vehicle HVAC (Heating, Ventilation, and Air Conditioning) system is in a "recirculate" mode in which little or no fresh air from outside the vehicle is drawn into the vehicle.

SUMMARY

According to an embodiment of the disclosure, a cooling system for electric equipment in a vehicle electric compartment comprises an air duct extending from the electric compartment to an HVAC intake, an air dump opening connecting the electric compartment with a non-passenger portion of the vehicle, and a valve movable to direct air exiting the electric compartment toward the air duct or toward the air dump opening. The cooling air from the electric compartment may thus be either drawn through the HVAC system for cooling before being returned to the passenger cabin, or it may be directed to the non-passenger portion from which it is expelled out of the vehicle through, for example, an air extractor vent.

According to a further disclosed embodiment, an automotive vehicle comprises a passenger cabin, an HVAC system adjustable between a fresh air mode wherein air from outside of the vehicle is drawn into the passenger cabin and a recirculate mode wherein air is recirculated within the passenger cabin, a compartment containing a heat-producing electrical component, the compartment supplied with a flow of cooling air, and a non-passenger compartment that is ventilated to outside of the vehicle. A duct has an inlet end adjacent the compartment and an outlet end adjacent an air intake of the HVAC system, and a valve controlling whether the air exiting the compartment is directed into the duct or into the non-passenger compartment or a split between the two. The valve is operated to direct a majority of the air exiting the compartment into the duct when the HVAC system is in the recirculate mode, and into the non-passenger compartment when the HVAC system is in the fresh (or outside) air mode. Air from the non-passenger compartment may be vented out of the vehicle through a body air extractor vent.

According to a another embodiment of the disclosure, a method of temperature control for an automotive vehicle comprises determining whether a vehicle HVAC system is in a fresh air mode or a recirculate mode, and directing air exiting an electrical compartment based at least in part on the HVAC system mode. If the HVAC system is in the fresh air mode, air exiting the electrical compartment is directed primarily to a ventilated non-passenger portion of the vehicle. If the HVAC system is in the recirculate mode, air exiting the electrical compartment is directed primarily to an HVAC intake.

Other features of the disclosed embodiments will be apparent from the following description of embodiments.

BRIEF DESCRIPTION OF THE DRAWINGS

Embodiments of the present invention will now be described by way of example only with reference to the accompanying drawings in which.

DETAILED DESCRIPTION

Figure 1:
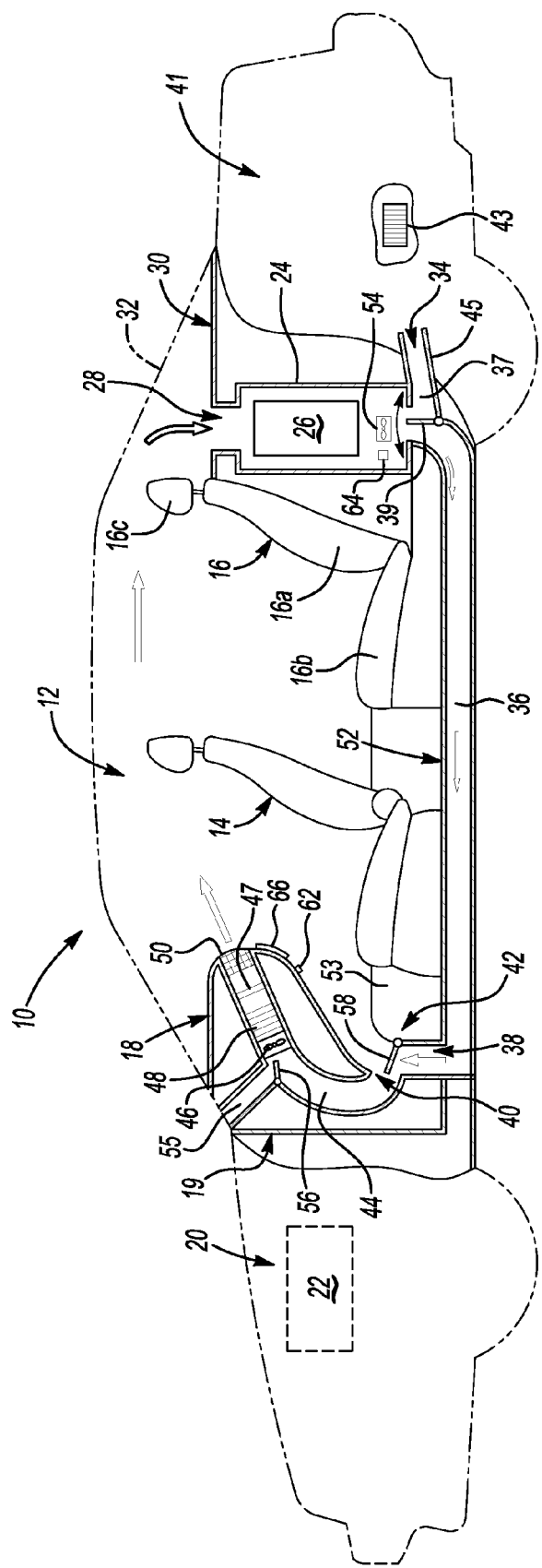
FIG. 1 is a simplified schematic diagram of a passenger vehicle having an electric compartment cooling air system according to an embodiment of the disclosure.

Referring to FIG. 1, an automotive vehicle 10 includes a passenger cabin 12 containing a front seating row 14 and a rear seating row 16. Seating rows 14, 16 may each be a single seat or multiple seats arranged across the width of the vehicle. The present invention may be practiced in a vehicle having any number of seating rows and seating positions. An instrument panel 18 is located in front of front seating row 14 in the conventionally known manner. A forward drivetrain compartment 20 contains electric and/or hybrid/electric drivetrain components, such as an electric motor 22. Forward drivetrain compartment 20 may also contain components such as a heater and/or air conditioning equipment, inverters, converters, and a power steering motor or pump (not shown), as is well known in the art.

An electric compartment 24 is located behind rear seating row 16 and contains electrical equipment 26. Electrical equipment 26 may comprise, as is well known in the electric and hybrid/electric vehicle arts, one or more batteries, battery chargers, converters (DC/DC, AC/DC, and/or DC/AC), and/or inverters. Electric compartment 24 is shown located immediately behind a seatback 16a of rear seating row 16, but may alternatively be partially or completely below the seat cushion 16b of the seating row, as determined by vehicle layout and packaging constraints. A cooling air inlet 28 is located adjacent the upper end of electric compartment 24, for example in the package tray area 30 between a headrest 16c and a rear window 32.

Electric compartment 24 has an exhaust opening 34 that communicates with a recirculation duct 36 and an air dump opening 37. An exhaust door 39 is movable between a recirc position in which most of the air flow exiting electric compartment 24 is directed into recirc duct 36, a dump position in which most of the air flow is directed toward air dump opening 37, or one or more intermediate positions (as shown in FIG. 1) dividing the air flow between the two.

Air dump opening 37 connects electric compartment 24 with a portion of the vehicle other than passenger cabin 12, for example a rear cargo compartment 41. Air dump opening 37 may lead to a length of duct 45 extending into or toward rear cargo compartment 41, as shown in FIG. 1, or it may open directly into the rear cargo compartment and have essentially zero length. Rear cargo compartment 41 is ventilated so that cooling air from electric compartment 24 may be expelled from vehicle 10. Ventilation may, for example, be provided by one or more air body extractor vents 43 in or adjacent to rear cargo compartment 41. A body air extractor vent, as well known in the automotive field, is a one-way valve that permits air to flow out of interior compartments of the vehicle, in this case out of the rear cargo compartment 41. Body air extractor vent 43 may, for example, communicate with a wheel well area or other underbody portion of the vehicle. Air dump opening 37 may connect directly with air body vent 43 or may discharge air into rear cargo compartment 41 some distance from the air extractor vent 43, as either configuration will allow the cooling air from electric compartment to vent overboard.

The rate of air flow through electric compartment 24 may be controlled by an exhaust fan 54. Exhaust fan 54 may be located in or adjacent to electric compartment 24 or it may be located at any point in or along duct 36 where it is able to control the air flow.

Recirculation duct 36 extends forward through the passenger cabin and has an outlet opening 38 directing exhaust air from electric compartment 24 towards a HVAC intake 40. In the embodiment shown, HVAC intake 40 is located adjacent a lower portion of instrument panel 18, for example in or adjacent to a footwell area 42 associated with front seating row 14. An HVAC fan 46 draws air into and through an HVAC duct 44 where it may be heated and/or cooled/dehumidified, as appropriate, by a heater 47 and an air conditioning heat exchanger 48 before being returned to the passenger and/or cargo compartment through vents 50. HVAC vents may be located in any number of positions throughout the vehicle cabin, vents 50 being shown in the upper portion of instrument panel 18 only as an example.

A fresh air intake duct 55 connects HVAC duct 44 with the exterior of the vehicle and a fresh/recirc door 56, as is well know in the automotive HVAC art, is movable to control the amount and proportion of fresh air (from outside of the vehicle) versus recirculated cabin air that is drawn into the HVAC system. The position of fresh/recirc door 56 may be controlled by an HVAC control module, as is discussed in more detail below.

An HVAC intake door 58 may be provided adjacent outlet opening 38 and is movable by, for example, an electric motor, to control the relative amounts of cabin air and electric compartment cooling air entering HVAC duct 44. HVAC intake door 58 may allow 100% cabin air, 100% electric compartment air, or any mixture thereof to enter HVAC duct 44. The position of HVAC intake door 58 may be controlled by an HVAC control module, as is discussed in more detail below.

Duct 36 may be located below a passenger cabin floor 52, as shown in FIG. 1, or may otherwise be integrated with portions of the passenger cabin structure. For example, duct 36 may be located on top of floor 52, or it may pass through or be integrated with a console 53 located between two seats or seating positions in a seating row, or it may extend behind or be integrated with a console, arm rest, or other trim panels (not shown) located outboard of a seating position. Duct 36 may have additional air inlet openings (not shown) located between exhaust opening 34 and outlet opening 38 to allow air from desired locations in the passenger cabin to be drawn into the duct and delivered to HVAC duct 44.

As mentioned above, outlet opening 38 directs the warm exhaust air from electric compartment 24 toward HVAC intake 40 where it is drawn into HVAC duct 44 and, if the HVAC system is operating in a cooling mode, the air will be cooled by heat exchanger 48 before being returned to cabin 12 through vents 50. The cooling/conditioning of the electric compartment exhaust air, combined with the fact that the air is returned to cabin 12 relatively far from rear seating row 16 and cooling air inlet 28, results in improved cooling of the electrical compartment 24. It also eliminates the tendency of the warm exhaust air accumulating and recirculating near rear seating row 16, thereby improving the comfort of rear seating row passenger(s). Both of these results are particularly noticeable and important if the HVAC system is operating in a "recirculate" mode.

Figure 2:
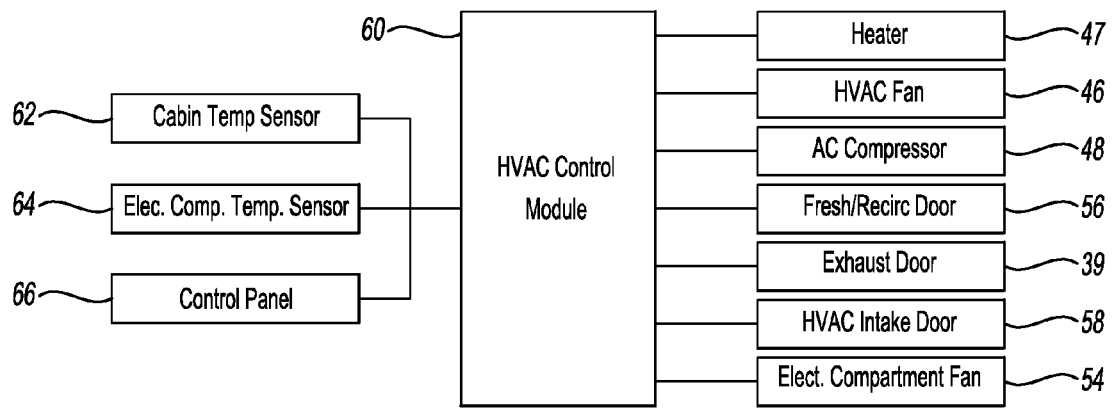
FIG. 2 is a simplified system block diagram of a vehicle HVAC system according to an embodiment of the disclosure.

As shown in the simplified system block diagram of FIG. 2, a climate control system includes an HVAC control module 60 which may be a microprocessor-based device such as a computer having a central processing unit, memory (RAM and/or ROM), and associated input and output buses. Module 60 may be an application-specific integrated circuit or other logic devices known in the art. Module 60 may be a portion of another control module, such as a central vehicle main control unit, or may be a stand-alone controller as shown.

HVAC control module 60 receives inputs from one or more components and/or systems, which may include a passenger cabin temperature sensor 62, an electric compartment temperature sensor 64, and a control panel 66 having control devices (such as switches, knobs, voice-recognition controls, etc.) by which occupants of the passenger cabin may select a desired cabin temperature and/or mode of HVAC system operation.

Based upon these and other appropriate inputs, HVAC control module 60 controls the operation of one or more components such as HVAC fan 46, air conditioner 48, heater 47, electric compartment fan 54, exhaust door 39, HVAC intake door 58, and fresh/recirc door 56 in accordance with programmed logic to optimize both passenger comfort and proper cooling of electric compartment 24. One of more of these components may alternatively be controlled by other electronic control modules (not shown) that are linked with HVAC module 60 via a high-speed data bus, such as a CAN or LIN bus, as is well known in the field of automotive electronics.

When the HVAC system is operating in the fresh air mode, fresh/recirc door 56 is positioned to draw all or a majority of air from outside of the vehicle. In the fresh mode, the position of exhaust door 39 should tend toward directing all or most of the air exiting electric compartment 24 toward air dump opening 37 so that it will be expelled from the vehicle through body air extractor vent 43. This overboard dumping of the air complements and enhances the flow of fresh air through passenger cabin 12. If the HVAC system includes an HVAC intake door 58 it may be positioned to substantially close off outlet opening 38 when in the fresh air mode. Other system components, such as fans 46 and 54, may be controlled by HVAC module 60 to operate as necessary based on other control settings and sensor readings.

When the HVAC system is in the recirculate mode, fresh/recirc door 56 is positioned to draw all or a majority of air from passenger cabin 12. In the recirc mode, exhaust door 39 is positioned to direct all or most of the air exiting electric compartment 24 into recirc duct 36 so that it will be expelled through outlet opening 38 and into HVAC intake 40. If the system includes an HVAC intake door 58, that door is positioned to admit at least some amount of air from recirc duct 36 into HVAC duct 44. The exhaust air from electric compartment, previously heated by equipment 26, is thus returned to the cabin through vents 50 and/or 38, both of which are located some distance from inlet 28, thus preventing a build-up of warm air in the passenger cabin near electric compartment 24. Depending upon factors such as occupant comfort settings, air conditioner 48 may be activated to cool the electric compartment exhaust air before it is returned to the passenger cabin 12. Other system components, such as fans 46 and 54, may be controlled by HVAC module 60 to operate as necessary based on other settings and sensor readings The position of exhaust door 39, as controlled by HVAC control module 60, may also be based in part upon other sensor or control inputs made by cabin occupant. For example, readings from temperature sensors 64 and/or 62, and or settings from control panel 66 may have an effect on the position of exhaust door 39

It is to be understood that an HVAC system may operate at any percentage or blend of fresh versus recirculated air, and also that the exhaust door 39 may be in any position between the extremes to direct the desired percentage of cooling air to recirc duct 36 versus air dump opening 37.

Figure 3:
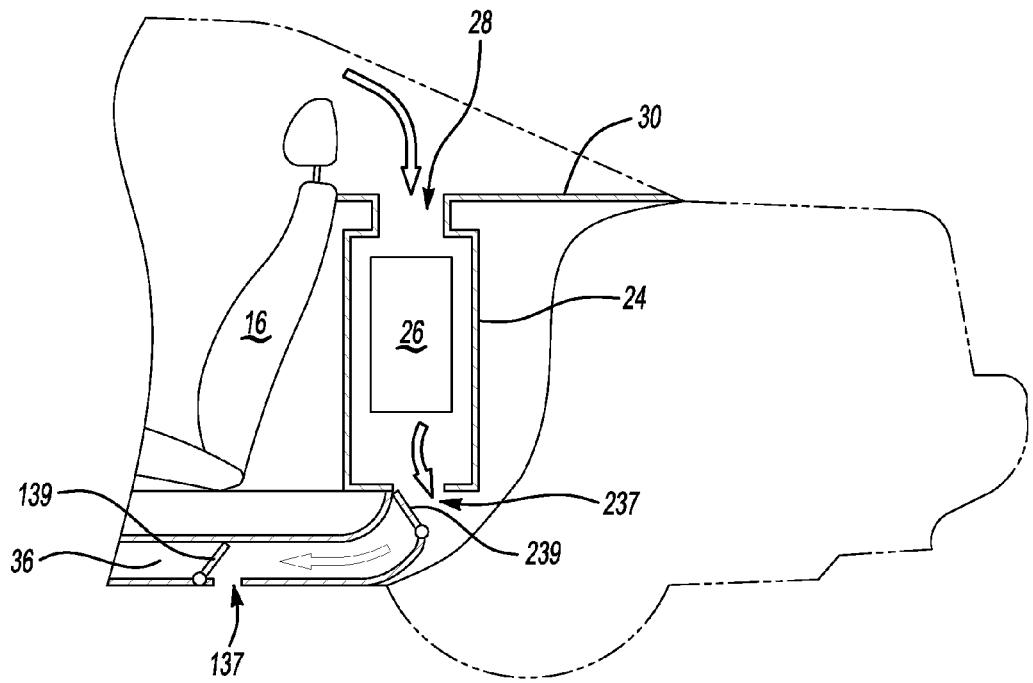
FIG. 3 is a simplified schematic diagram showing alternative embodiments of a cooling air system.

FIG. 3 shows two possible alternative positions for an exhaust door in accordance with embodiments of the invention. Exhaust door 139 is movable between the exhaust position (shown in FIG. 3) in which exhaust air is vented out of an opening 137 in duct 36 and a recirc position (not shown) in which air dump opening 137 is closed off so that exhaust air is routed forward through duct 36. Similarly, exhaust door 239 is movable between the exhaust position (shown in FIG. 3) in which exhaust air is vented out of an opening 237 and a recirc position (not shown) in which air dump opening 237 is closed off so that exhaust air is routed forward through duct 36.

The present invention has been described in an illustrative manner. It is to be understood that the terminology used is intended to be in the nature of words of description rather than of limitation.

Many modifications and variations of the present invention are possible in light of the above teachings. Therefore, within the scope of the appended claims, the present invention may be practiced other than as specifically described. For example, the invention may be practiced in a vehicle having more that two seating rows arranged fore-and-aft in the cabin.

What is claimed:
1. An electric-powered automotive vehicle comprising:
a passenger cabin;
an HVAC system adjustable between a fresh air mode wherein air from outside of the vehicle is drawn into the passenger cabin and a recirculate mode wherein air is recirculated within the passenger cabin, the HVAC system receiving air through an air intake adjacent to and drawing air from a footwell forward of a seating row;
a compartment containing a heat-producing electrical component, the compartment supplied with a flow of cooling air;
a non-passenger compartment that is ventilated to outside of the vehicle;
a duct having an inlet end adjacent the compartment and an outlet end that opens into the footwell adjacent to the air intake of the HVAC system;
a valve directing a majority of exhaust air exiting the electric compartment into the duct when the HVAC system is in the recirculate mode, and the valve directing a majority of exhaust air to the non-passenger compartment when the HVAC system is in the fresh air mode; and
an HVAC intake door adjacent to the duct outlet end controlling relative amounts of cabin air and electric compartment cooling air entering the HVAC intake.

2. The vehicle according to claim 1 further comprising at least one of a passenger cabin temperature sensor, an electric compartment temperature sensor, and an occupant actuated control device, and wherein the valve is controlled at least in part by a signal from at least one of these.

3. The vehicle according to claim 2 wherein the duct passes beneath the seating row.

4. The vehicle according to claim 1 further comprising a fan forcing the cooling air through the duct from the compartment to the HVAC system intake.

5. The vehicle according to claim 1 further comprising an exhaust duct having an inlet end adjacent the compartment and an outlet end in the non-passenger compartment.

6. The vehicle according to claim 1 further comprising an air extractor vent in the non-passenger compartment.

* * * * *